United States Patent
Lesko et al.

(10) Patent No.: US 11,892,421 B2
(45) Date of Patent: Feb. 6, 2024

(54) SYSTEM AND METHOD FOR CLEANING ELECTRICAL STABILITY PROBE

(71) Applicant: Schlumberger Technology Corporation, Sugar Land, TX (US)

(72) Inventors: Timothy Lesko, Sugar Land, TX (US); Jerry Thomas Connaughton, Richmond, TX (US); Zakhar Chizhov, Katy, TX (US); Kenneth Slater, Sealy, TX (US); Bojan Mitric, Houston, TX (US); Mauricio Tassano, Scott, LA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 128 days.

(21) Appl. No.: 17/542,629

(22) Filed: Dec. 6, 2021

(65) Prior Publication Data

US 2023/0175997 A1    Jun. 8, 2023

(51) Int. Cl.
*G01N 27/07* (2006.01)
*G01N 27/38* (2006.01)

(52) U.S. Cl.
CPC ............. *G01N 27/07* (2013.01); *G01N 27/38* (2013.01)

(58) Field of Classification Search
CPC ...... G01N 17/00; G01N 17/006; G01N 17/02; G01N 27/07; G01N 27/38; G01N 2015/1272; G01R 3/00

(Continued)

(56) References Cited

U.S. PATENT DOCUMENTS

| 4,023,096 A | * | 5/1977 | Schmidt | ............ G01R 27/2605 422/50 |
| 4,484,468 A | | 11/1984 | Gau | |

(Continued)

FOREIGN PATENT DOCUMENTS

| CA | 2680267 C | * | 9/2012 | ............ C02F 1/4696 |
| CA | 2968572 C | * | 4/2023 | ............ B64C 27/46 |

(Continued)

OTHER PUBLICATIONS

Roanes et al., Real-Time Drilling Fluid Monitoring and Analysis—Adding to Integrated Drilling Operations, SPE-151459-MS, IADC/SPE Drilling Conference and Exhibition, Mar. 6-8, 2012, San Diego, California, USA, 9 pages.

(Continued)

*Primary Examiner* — Jermele M Hollington
*Assistant Examiner* — Sean Curtis

(57) ABSTRACT

An electrical stability testing device includes a cup configured to receive a fluid sample. The testing device also includes a pair of electrodes positioned at least partially within the cup. The electrodes are spaced apart from one another by a predetermined gap. The electrodes are configured to have the fluid sample positioned within the predetermined gap while performing an ES test on the fluid sample in the cup. The testing device also includes a wiper positioned at least partially within the cup. The wiper is configured to pass between the electrodes after the ES test has concluded. A width of the wiper is greater than the predetermined gap between the electrodes. The wiper is configured to deform as the wiper passes through the predetermined gap such that the width becomes substantially equal to the predetermined gap and sides of the wiper contact ends of the electrodes to clean the electrodes.

23 Claims, 10 Drawing Sheets

(58) Field of Classification Search
USPC ............................ 324/693, 758.01; 204/247.2
See application file for complete search history.

(56) References Cited

U.S. PATENT DOCUMENTS

| | | | |
|---|---|---|---|
| 4,528,647 | A | 7/1985 | Chamberlain |
| 4,528,657 | A | 7/1985 | Meehan |
| 4,724,589 | A | 2/1988 | Walker |
| 4,734,580 | A * | 3/1988 | Rodrigo .................. H01T 21/00 361/230 |
| 5,361,631 | A | 11/1994 | Covington |
| 5,519,214 | A | 5/1996 | Houwen |
| 6,012,325 | A | 1/2000 | Ma |
| 6,111,930 | A | 8/2000 | Schipper |
| 6,233,307 | B1 | 5/2001 | Golenhofen |
| 6,301,335 | B1 | 10/2001 | Alfthan |
| 6,668,039 | B2 | 12/2003 | Shepard |
| 6,801,039 | B2 | 10/2004 | Fabris |
| 6,906,535 | B2 * | 6/2005 | Murphy, Jr. ............. C09K 8/36 324/366 |
| 7,564,948 | B2 | 7/2009 | Wraight |
| 8,994,389 | B2 * | 3/2015 | Growcock ......... G01N 33/2823 324/724 |
| 9,244,026 | B2 | 1/2016 | Stock |
| 9,777,542 | B2 * | 10/2017 | Stock ................... G01N 23/223 |
| 2001/0013247 | A1 | 8/2001 | Wilson |
| 2001/0042400 | A1 | 11/2001 | Boyle |
| 2004/0104355 | A1 | 6/2004 | DiFoggio |
| 2004/0234029 | A1 | 11/2004 | De Lange |
| 2005/0031073 | A1 | 2/2005 | Radley |
| 2005/0129580 | A1 | 6/2005 | Swinehart |
| 2007/0087927 | A1 | 4/2007 | Scott |
| 2007/0151762 | A1 | 7/2007 | Reitsma |
| 2007/0231217 | A1 | 10/2007 | Clinton |
| 2007/0247328 | A1 | 10/2007 | Petrovic |
| 2008/0283294 | A1 | 11/2008 | Colquhoun |
| 2009/0087911 | A1 | 4/2009 | Ramos |
| 2009/0096440 | A1 * | 4/2009 | Murphy ................. G01N 27/92 324/92 |
| 2009/0141862 | A1 | 6/2009 | Dunham |
| 2010/0004890 | A1 | 1/2010 | Tonmukayakul |
| 2010/0158704 | A1 | 6/2010 | Charlton |
| 2010/0256914 | A1 | 10/2010 | Hutin |
| 2010/0283492 | A1 * | 11/2010 | Growcock ............. G01N 27/92 324/724 |
| 2011/0048377 | A1 | 3/2011 | Song |
| 2015/0316527 | A1 * | 11/2015 | Stock ...................... G01N 27/92 73/54.16 |
| 2016/0047227 | A1 * | 2/2016 | Sato ...................... G01P 15/125 73/152.58 |
| 2017/0292902 | A1 * | 10/2017 | Bardapurkar ......... E21B 49/003 |
| 2021/0096101 | A1 * | 4/2021 | Harrison .............. G01N 29/036 |
| 2022/0158156 | A1 * | 5/2022 | Naoi ...................... H01M 4/139 |
| 2022/0178906 | A1 | 6/2022 | Slater et al. |
| 2023/0175997 | A1 * | 6/2023 | Lesko .................... G01N 27/07 324/693 |

FOREIGN PATENT DOCUMENTS

| | | | |
|---|---|---|---|
| CN | 2095419 U | 2/1992 | |
| CN | 2488064 Y * | 4/2002 | |
| CN | 2488064 Y | 4/2002 | |
| CN | 2786615 Y | 6/2006 | |
| CN | 2816796 Y | 9/2006 | |
| CN | 2938073 Y | 8/2007 | |
| CN | 101078696 A | 11/2007 | |
| CN | 101158696 A | 4/2008 | |
| CN | 201181282 Y | 1/2009 | |
| CN | 101498657 A | 8/2009 | |
| CN | 101551347 A | 10/2009 | |
| CN | 101629916 A | 1/2010 | |
| DE | 19911011 A1 | 9/2000 | |
| EP | 2977751 A1 * | 1/2016 | ............. E21B 21/01 |
| GB | 2417564 A | 3/2006 | |
| JP | 05256803 A | 10/1993 | |
| JP | 0823518 B2 | 3/1996 | |
| SU | 655933 A1 | 4/1979 | |
| WO | 0054025 A1 | 9/2000 | |
| WO | 2007073517 A3 | 6/2008 | |
| WO | 2009055672 A1 | 4/2009 | |
| WO | WO-2009062041 A2 * | 5/2009 | ............. G01N 27/92 |
| WO | 2009062041 A3 | 8/2009 | |
| WO | WO-2011100435 A2 * | 8/2011 | ............. E21B 21/01 |

OTHER PUBLICATIONS

"The Mud Watcher", Mud Automatics, retrieved from http:f/www.mudautomatics.com/Standard.aspx?d=18&pid=1;3;22, Accessed Aug. 19, 2014, 1 page.
Saasen et al., Automatic Measurement of Drilling Fluid and Drill-Cuttings Properties, SPE 112687, IADC/SPE Drilling conference, Mar. 4-6, 2008, Orlando, Florida, USA. Also republished in Dec. 2009 SPE Drilling and Completion Magazine, 15 pages.
Fann 23D Electrical Stability Tester (EST specifications, Fann Instrument Company, 2007, p. 1-2, htt;://eurosul.com/brochures/Electrical_Stability_Tester_EST.pdf.
Ali, A. et al., "Investigation of the electrical stability test for oil muds", Proceedings SPE/IADC Drilling Conference, No. 16077, Mar. 15, 1987, pp. 227-241.
Growcock, F. B. et al., "Electrical stability, emulstion stability, and wettability of invert oil-based muds", SPE Drilling and Completion, The Society, Richardson, Texas, U.S.A., vol. 9, No. 1, Mar. 1, 1994, pp. 39-46.
Examiners Report issued in corresponding Canadian Application No. 2704677 dated Mar. 8, 2012, 3 pages.
Office Action issued in corresponding Eurasian Application No. 201070593 dated May 25, 2012, 2 pages.
Official Action issued in corresponding Eurasian Application No. 201070593 dated Nov. 9, 2012, 4 pages.
Official Action issued in corresponding Eurasian Application No. 201070593 dated Apr. 4, 2013, 5 pages.
Official Action issued in corresponding Eurasian Application No. 201070593/31 dated Nov. 5, 2013, 3 pages with English translation.
Official Action issued in corresponding Eurasian Application No. 201070593/31 dated Jun. 5, 2014, 3 pages with English translation.
Supplementary Search Report and Opinion issued in corresponding European Application No. 08 848 125.4 dated Jul. 31, 2012, 6 pages.
Office Action issued in corresponding European Application No. 08848125.4 dated Apr. 4, 2013, 5 pages.
Office Action issued in corresponding European Application No. 08848125.4 dated Aug. 22, 2013, 4 pages.
Office Action issued in corresponding European Application No. 08848125.4 dated Jan. 28, 2014, 3 pages.
Office Action issued in corresponding Mexican Application No. MX/a/2010/005058 and English Reporting thereof dated Jul. 30, 2013, 9 pages.
Examination Report issued in corresponding Saudi Arabian Application No. 08290716, dated Sep. 13, 2011 and English explanation thereof (10 pages).
Office Action issued in U.S. Appl. No. 12/741,051 dated May 17, 2012, 9 pages.
Office Action issued in U.S. Appl. No. 12/741,051 dated Jan. 7, 2013, 12 pages.
Office Action issued in U.S. Appl. No. 12/741,051 dated May 10, 2013, 12 pages.
Office Action issued in U.S. Appl. No. 12/741,051 dated Nov. 1, 2013, 12 pages.
Office Action issued in U.S. Appl. No. 12/741,051 dated Feb. 13, 2014, 12 pages.
Office Action issued in U.S. Appl. No. 12/741,051 dated Sep. 2, 2014, 14 pages.
International Search Report from PCT/US2008/082809 dated Jun. 19, 2009, 3 pages.
Written Opinion from PCT/US2008/082809 dated Jun. 19, 2009, 4 pages.

(56) References Cited

OTHER PUBLICATIONS

Examination Report for the equivalent Australian patent application 2011215835 dated Dec. 22, 2014.
Examination Report for the equivalent Australian patent application 20162313571 dated May 4, 2017.
Search Report to Chinese Patent Application No. 201180018419.4 dated Jan. 6, 2014, 27 pages.
Second Office Action for Chinese Patent Application No. 201180018419.4 dated Oct. 24, 2014, 19 pages.
Third Office Action for the equivalent Chinese patent application 201180018419.4 dated May 11, 2015.
Fourth Office Action for the equivalent Chinese patent application 201180018419.4 dated Jul. 26, 2016.
Office Action for equivalent Eurasian patent application 201290760 dated Mar. 13, 2014.
Office Action for equivalent Eurasian patent application 201400741 dated Mar. 9, 2016.
Office Action for equivalent Eurasian patent application 201290760 dated May 11, 2016.
Partial Search Report for the equivalent European patent application 11742797.1 dated Jun. 17, 2015.
Extended Search Report for the equivalent European patent application 11742797.1 dated Oct. 2, 2015.
Extended Search Report for the equivalent European patent application 15184306.7 dated Dec. 18, 2015.
Office Action for the equivalent Indonesian patent application 00201203218 dated Oct. 31, 2016.
Office Action for the equivalent Mexican patent application MX/a/2012/009163 dated May 15, 2014.
Office action for the equivalent Malaysian patent application PI2012700544 dated Jan. 31, 2017.
International Search Report and Written Opinion issued in International Patent application PCT/US2011/024356 dated Dec. 28, 2011.
Halliburton Baroid, "Real-Time Mud Measurement", 2005, 16 pages.
Search Report issued in related EP application 11742798.9 dated Nov. 17, 2015, 7 pages.
Examination Report issued in AU2011215837 dated Feb. 5, 2014, 2 pages.
Office Action issued in CN201180012999.6 dated Mar. 31, 2014, 7 pages.
Office Action issued in EA201290766 dated Jan. 13, 2014, 2 pages.
Office Action issued in EA201290766 dated Nov. 27, 2014, 5 pages.
International Search Report and Written Opinion issued in PCT/US2011/024358 dated Oct. 21, 2011, 9 pages.
Search Report and Written Opinion issued in International Patent Application No. PCT/US2022/051981 dated Apr. 19, 2023, 12 pages.

* cited by examiner

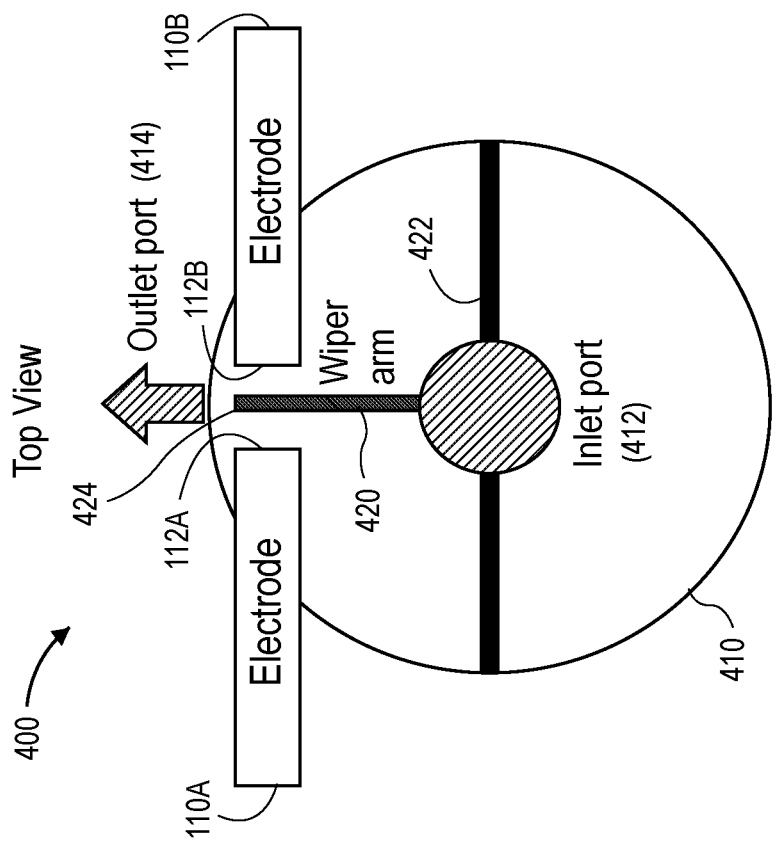
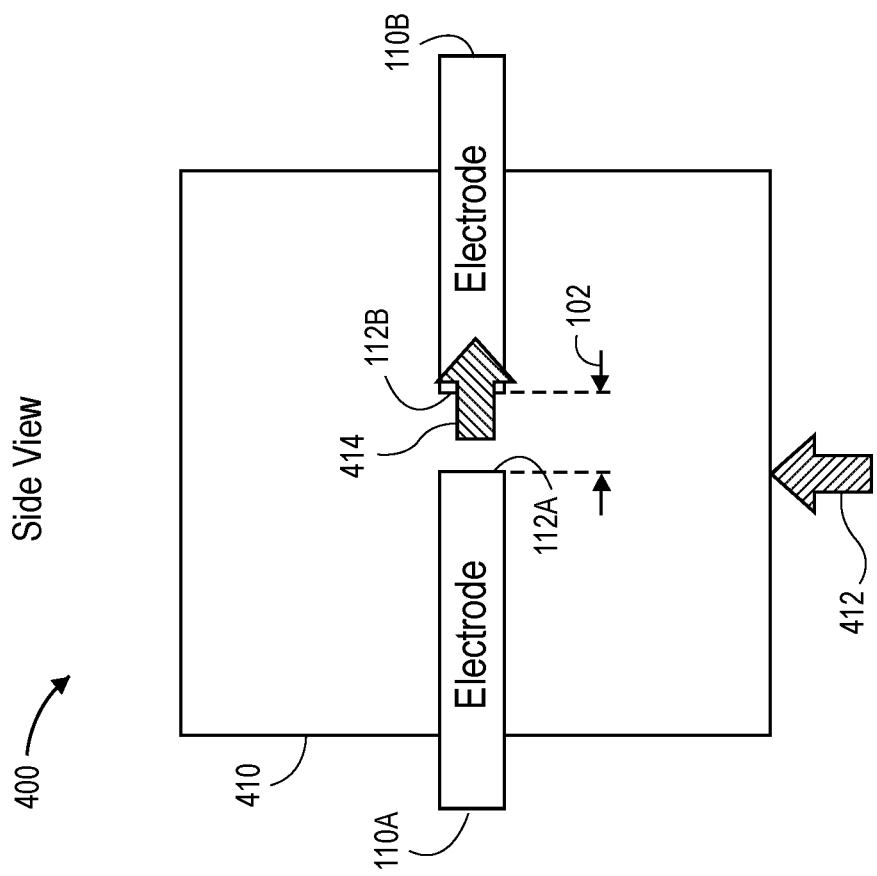
FIG. 5B
FIG. 5A

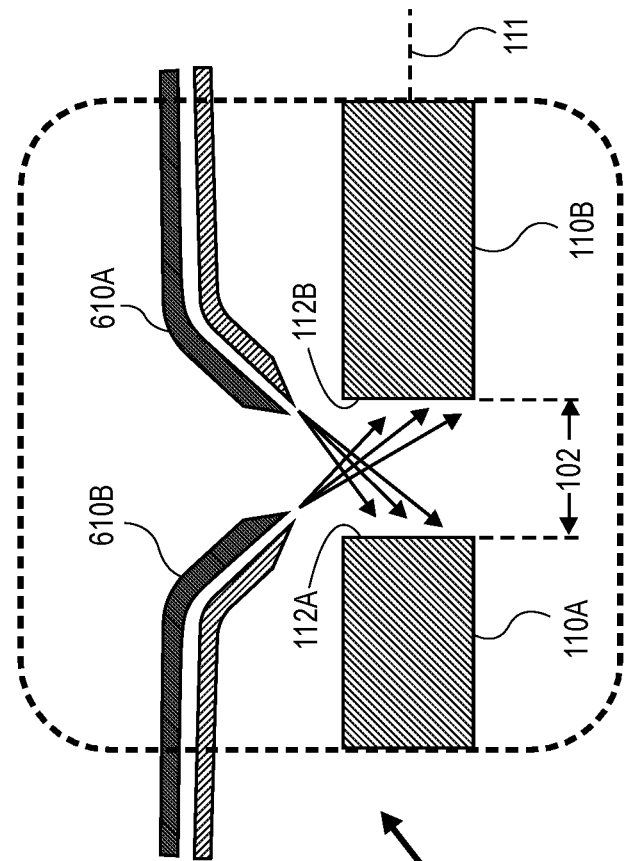
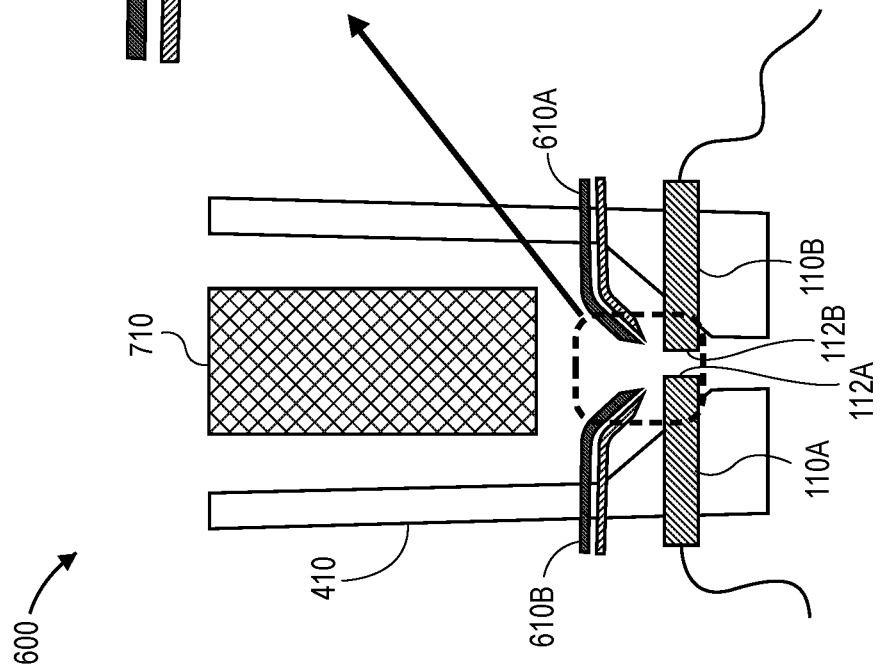
FIG. 7B
FIG. 7A

SYSTEM AND METHOD FOR CLEANING ELECTRICAL STABILITY PROBE

BACKGROUND

An electrical stability (ES) test may be performed on a fluid sample to determine the emulsion stability and/or oil-wetting properties of the fluid sample. The ES test is performed by placing an ES probe into the fluid sample. The ES probe includes two electrodes that are spaced apart by a predetermined gap. The testing is dependent upon the electrodes being (and remaining) separated from one another by the predetermined gap. However, the testing may cause the electrodes to erode, which may increase the gap. The testing may also or instead cause a build-up of material (e.g., fluid residue) on the electrodes, which may decrease the gap. As a result, it is desirable to clean the electrodes between tests to help maintain the predetermined gap.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electrical stability (ES) testing device is disclosed. The ES testing device includes a cup configured to receive a fluid sample. The ES testing device also includes a pair of electrodes positioned at least partially within the cup. The electrodes are spaced apart from one another by a predetermined gap. The electrodes are configured to have the fluid sample positioned within the predetermined gap while performing an ES test on the fluid sample in the cup. The ES testing device also includes a wiper positioned at least partially within the cup. The wiper is configured to pass between the electrodes after the ES test has concluded. A width of the wiper is greater than the predetermined gap between the electrodes. The wiper is configured to deform as the wiper passes through the predetermined gap such that the width becomes substantially equal to the predetermined gap and sides of the wiper contact ends of the electrodes to clean the electrodes.

In another embodiment, the ES testing device includes a cup configured to receive a fluid sample. The ES testing device also includes a pair of electrodes positioned at least partially within the cup. The electrodes are spaced apart from one another by a predetermined gap. The electrodes are configured to have the fluid sample positioned within the predetermined gap while performing an ES test on the fluid sample in the cup. The ES testing device also includes a port positioned at least partially within the cup. The port is configured to have a cleaning fluid flow therethrough after the ES test has concluded. The cleaning fluid flows toward the electrodes, through the predetermined gap, or both at a velocity that is greater than or equal to about 5 m/s to clean the electrodes.

A method for performing an electrical stability (ES) test is also disclosed. The method includes increasing a voltage applied to a pair of electrodes until an electrical current between the electrodes reaches a predetermined threshold. The electrodes are submerged within a fluid sample within a cup. The electrodes are spaced apart from one another by a predetermined gap. The method also includes decreasing the voltage after the electrical current reaches the predetermined threshold. The method also includes causing a wiper in the cup to pass through the predetermined gap and contact the electrodes after the voltage is decreased. A width of the wiper is greater than the predetermined gap. The wiper is configured to deform as the wiper passes through the predetermined gap such that the width becomes substantially equal to the predetermined gap and sides of the wiper contact ends of the electrodes to clean the electrodes.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIGS. 5A and 5B illustrate a side view and a top view, respectively, of the ES testing device with the electrodes and/or a wiper placed closer to an inlet and/or an outlet, according to an embodiment.

FIGS. 7A and 7B illustrate a side view and an enlarged portion of the side view, respectively, of the ES testing device with two cleaning fluid outlets, according to an embodiment.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

The systems and methods described herein may automatically clean the electrodes of an electrical stability (ES) probe that is used to conduct an ES test on a fluid sample. The fluid sample may be or include invert-emulsion drilling fluids. For example, the fluid sample may be or include water-in-oil fluids (e.g., oil-based and/or synthetic-based drilling muds).

ES Test

Figure 1:
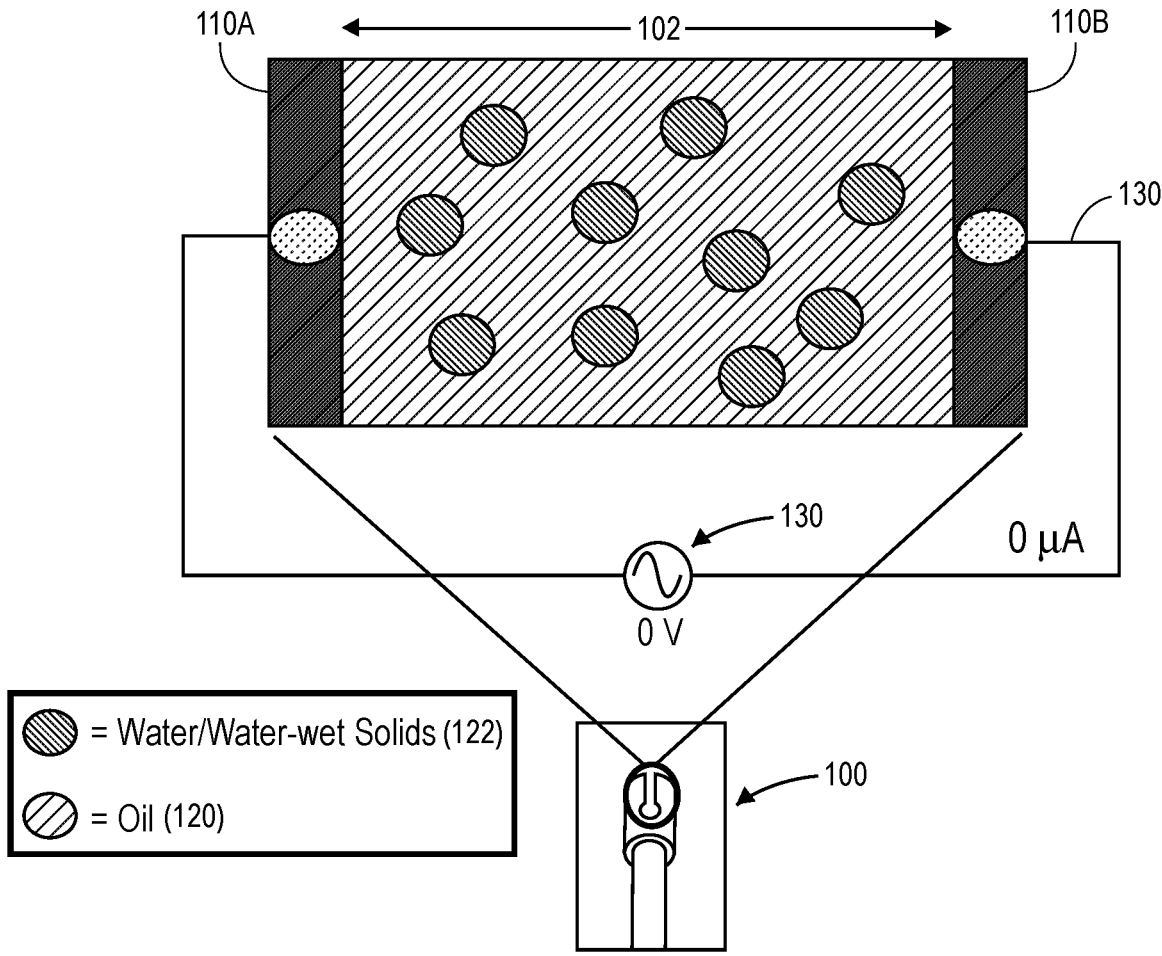
FIG. 1 illustrates a portion of an ES probe having two electrodes, according to an embodiment.

FIG. 1 illustrates a portion of an ES probe 100 having two electrodes 110A, 110B, according to an embodiment. The electrodes 110A, 110B may be spaced apart by a predetermined gap 102 (e.g., 1.55 mm). The ES probe 100 (e.g., the electrodes 110A, 110B) may be at least partially submerged in a fluid sample to conduct the ES test. As discussed above, the fluid sample may be or include oil 120 having water and/or water-wet solids 122 therein. In FIG. 1, no voltage is being applied to the electrodes 110A, 110B. As a result, the fluid sample is stable.

Figure 2:
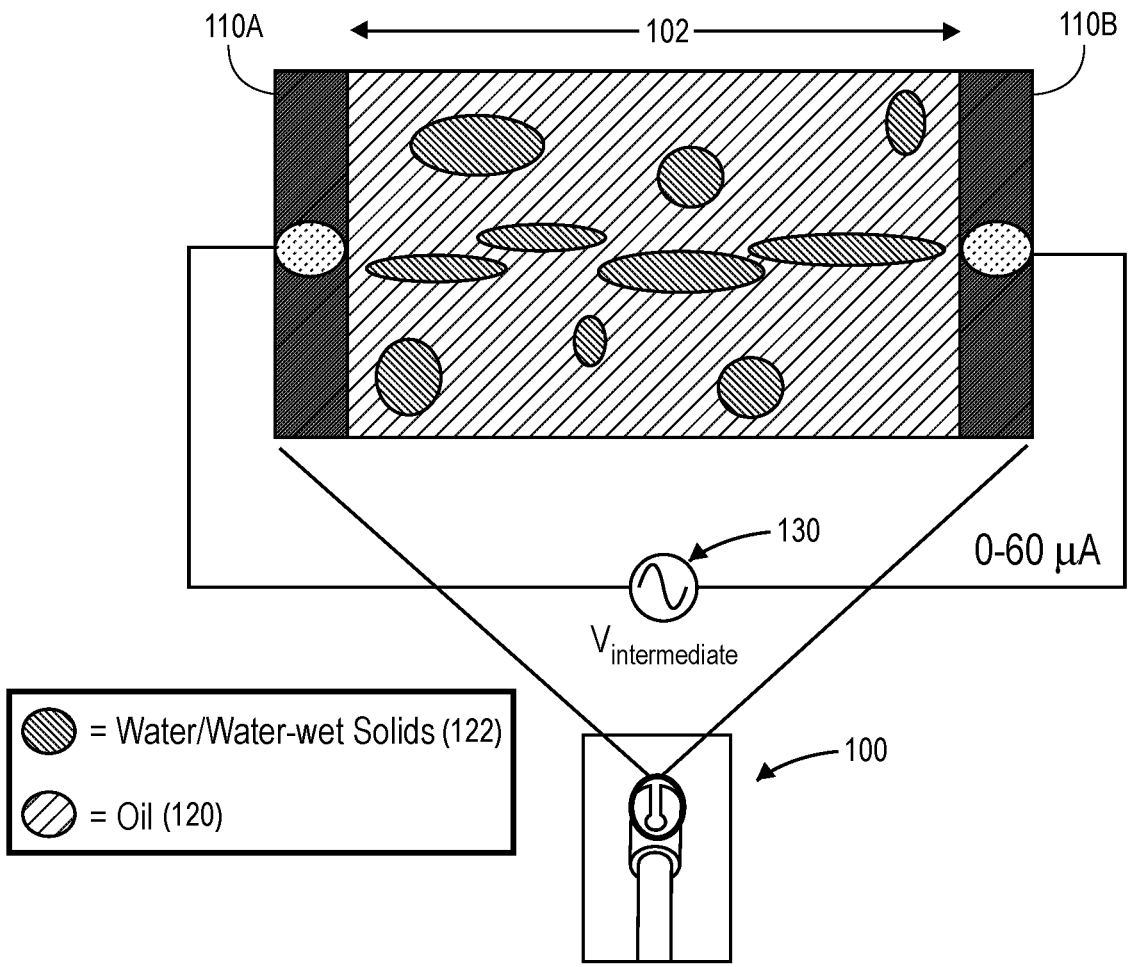
FIG. 2 illustrates the portion of the ES probe with an intermediate voltage applied to the electrodes by a voltage source, according to an embodiment.

FIG. 2 illustrates the portion of the ES probe 100 with an intermediate voltage applied to the electrodes 110A, 110B by a voltage source 130, according to an embodiment. The voltage source 130 may be a 340 V Hz sinusoidal source. The voltage source 130 may be configured to increase the voltage at a predetermined rate (e.g., 150 V/sec). As may be seen, in response to the intermediate voltage, the solids 122 begin to form a conductive path between the electrodes 110A, 110B as the voltage is increased. The electrodes 110A, 110B may measure the electrical current (e.g., amperage) between the electrodes 110A, 110B (e.g., across the conductive path) as the voltage is increased.

Figure 3:
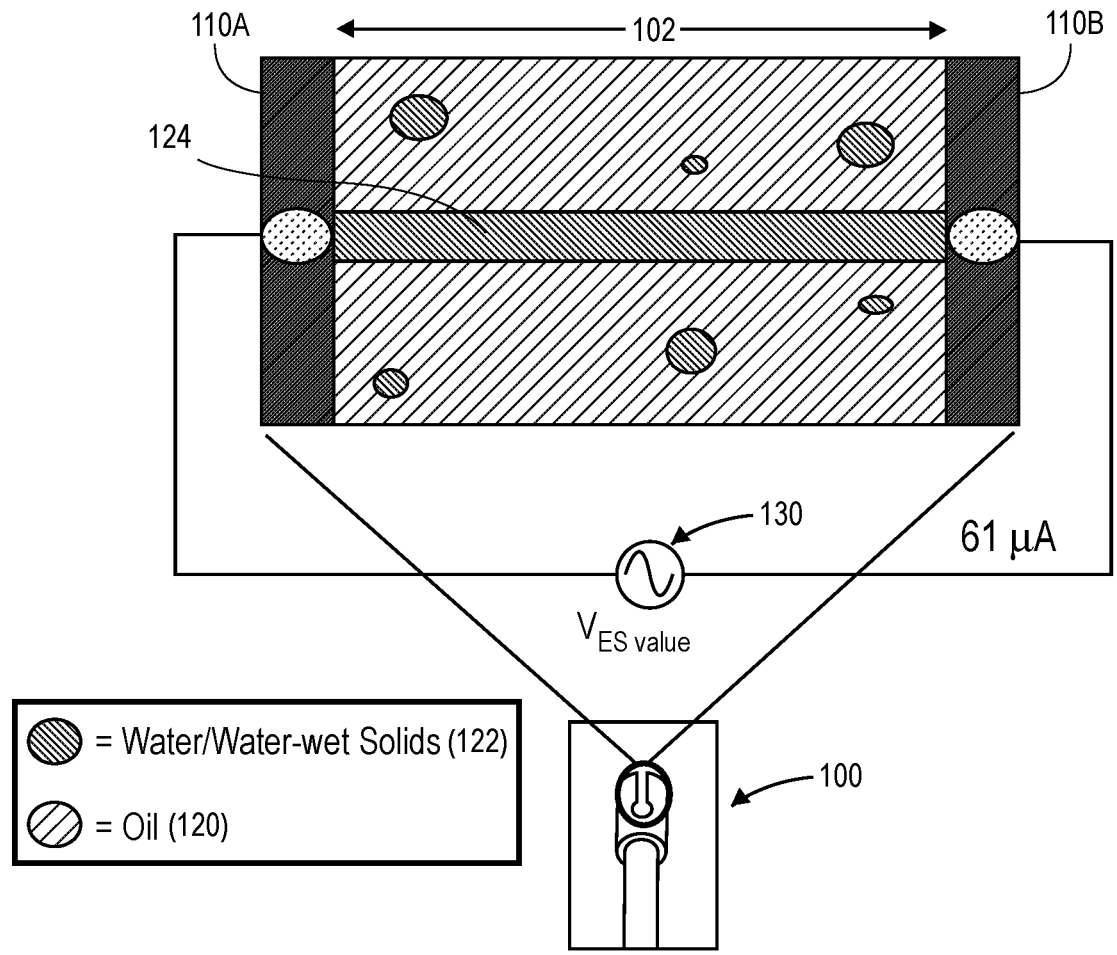
FIG. 3 illustrates the portion of the ES probe with a breakdown voltage applied to the electrodes by the voltage source, according to an embodiment.

FIG. 3 illustrates the portion of the ES probe 100 with a breakdown voltage applied to the electrodes 110A, 110B by the voltage source 130, according to an embodiment. The breakdown voltage may be the voltage that causes the solids 122 to form a conductive path 124 between the electrodes 110A/110B, which allows the electrical current to reach the predetermined level (e.g., 61 microamps). The breakdown voltage is recorded for the fluid sample, and the voltage is then reduced back down to 0 V. The electrodes 110A, 110B may then be cleaned.

Cleaning the Electrodes

Figures 4A, 4B:
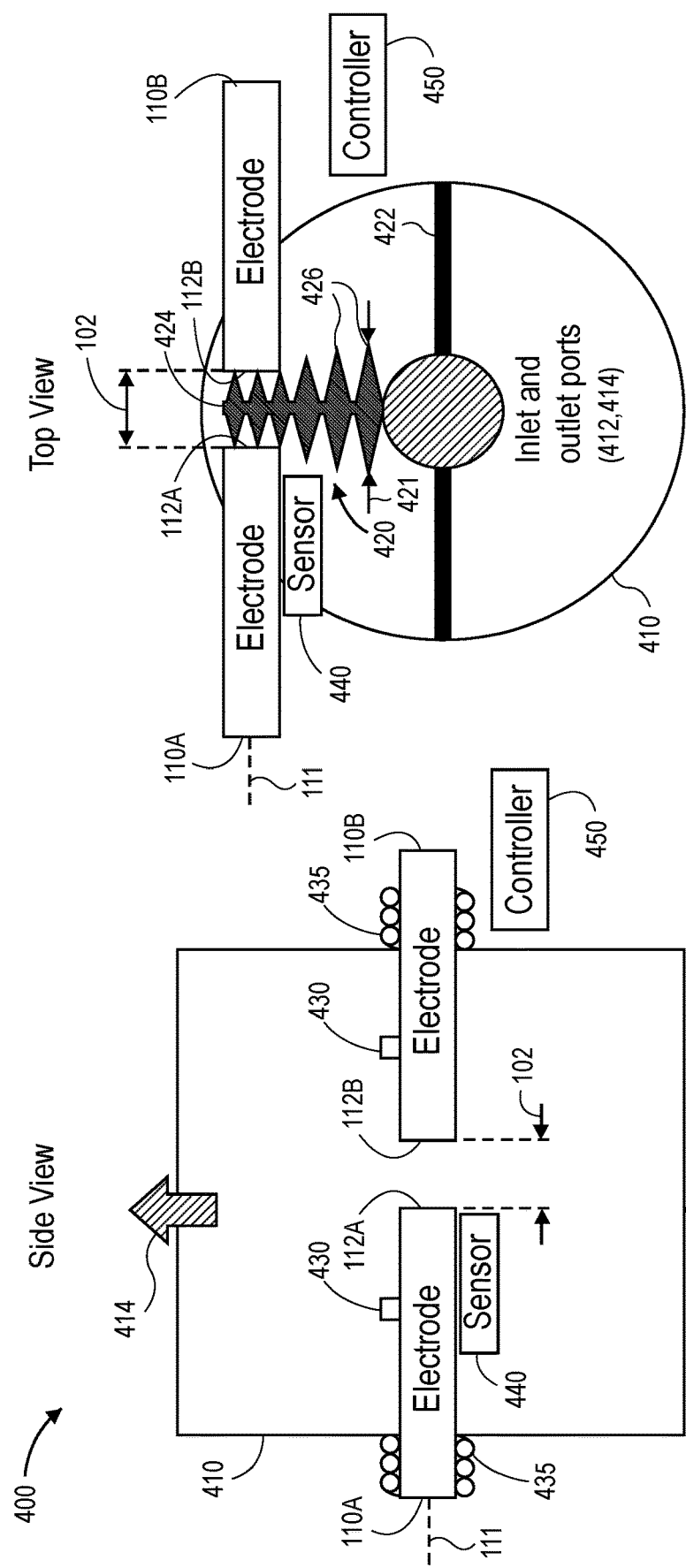
FIGS. 4A and 4B illustrate a side view and a top view, respectively, of an ES testing device, according to an embodiment.

FIGS. 4A and 4B illustrate a side view and a top view, respectively, of an ES testing device 400, according to an embodiment. The testing device 400 may include a cup (also referred to as a cell) 410. The cup 410 may include an inlet 412 and an outlet 414. In the embodiment shown, the inlet 412 may be proximate to a bottom of the cup 410, and the outlet 414 may be proximate to a top of the cup 414. Although not shown, the fluid sample to be tested may flow into the cup 410 via the inlet 412, flow upward through the cup 410, and then flow out of the cup 410 via the outlet 414. The fluid sample may flow before the test is conducted, simultaneously with the test being conducted, after the test is conducted, or a combination thereof. As used herein, the term "flow" is used to indicate that the fluid sample is moving (e.g., through the inlet 412, through the predetermined gap 102, through the outlet 414, or a combination thereof).

A portion of the probe 100 (e.g., the electrodes 110A, 110B) may be positioned at least partially within the fluid sample in the cup 410 and separated from one another by the predetermined gap 102. A central longitudinal axis 111 through the electrodes 110A, 110B may be substantially horizontal, which may be substantially perpendicular to the direction that the fluid sample flows, which may be substantially vertical (e.g., upwards).

In one embodiment, a wiper (also referred to as a wiper arm) 420 may be positioned at least partially in the cup 410. After the ES test has concluded and the voltage supplied to the electrodes 110A, 110B has been turned off (e.g., between ES tests), the wiper 420 may be configured to rotate around a wiper axis 422 to clean the electrodes 110A, 110B. As the wiper 420 rotates, it may cycle between a first rotational position and a second rotational position. In the first rotational position, as shown in FIG. 4B, at least a portion of the wiper 420 is positioned at least partially between the electrodes 110A, 110B. In the second rotational position, the wiper 420 is not positioned between the electrodes 110A, 110B. The wiper 420 may be in the second rotational position during testing.

A width/thickness 421 of the wiper 420 may be less than, substantially equal to (e.g., +/−0.10 mm), or greater than the predetermined gap 102 (e.g., 1.55 mm) between the electrodes 110A, 110B. When greater than the predetermined gap 102, the sides of the wiper 420 contact ends 112A, 112B of the electrodes 110A, 110B as the wiper 420 passes through the electrodes 110A, 110B. The ends 112A, 112B may face one another.

The wiper 420 may be made of a fluoropolymer. More particularly, the wiper 420 may be made of tetrafluoroethylene (e.g., polytetrafluoroethylene (PTFE)). The wiper 420 may also or instead include a braced and/or deformable elastomeric scraper with the width 421 being greater than the predetermined gap 102, and the wiper 420 may deform to pass through the predetermined gap. Having the wiper 420 deform may allow for more contact with the surface to be cleaned (e.g., the ends 112A, 112B of the electrodes 110A, 110B). In one embodiment, the wiper 420 may be contoured as it deforms to substantially match the surface to be cleaned. The wiper 420 may also or instead include a brush, bristle, and/or pad assembly, which may increase the cleaning of the electrodes 110A, 110B. The wiper 420 may also or instead include one or more ridges or blades 426 on the sides of the wiper 420. For example, the wiper 420 may have 10 or more, 100 or more, or 1000 or more ridges or blades 426 that are 3D printed onto the sides of the wiper 420. The wiper 420 may also or instead include a textured surface (e.g., dimpled, tiled, chevroned, scaled, and/or ribbed), which may increase the cleaning of the electrodes 110A, 110B. The wiper 420 may also or instead include a geometry that is configured to induce a predetermined flow regime through the electrodes 110A, 110B (e.g., turbulent, transitional, and/or laminar), which may increase the cleaning of the electrodes 110A, 110B.

As the measurement relies upon the electrodes 110A, 110B being separated by the predetermined gap, in at least one embodiment, the spacing (i.e., the width of the gap) between the electrodes 110A, 110B may be modified. For example, if the electrodes 110A, 110B are eroded due to the abrasive media in the fluid sample and/or the contact with the wiper 420, which may increase the distance between the electrodes 110A, 110B, the spacing between the electrodes 110A, 110B may be reduced to restore the predetermined gap 102. The spacing may be modified by loosening fasteners (e.g., screws) 430, moving the electrodes 110A, 110B closer together or farther apart, and then re-tightening the fasteners 430.

In another embodiment, one or more biasing members (two are shown: 435) may exert a force on the electrodes 110A, 110B that pushes the electrodes 110A, 110B toward one another. In an example, the biasing members 435 may be or include springs. When the width 421 of the wiper 420 is greater than the predetermined gap 102, the biasing members 110A, 110B may allow the electrodes 110A, 110B to move farther apart so that the wiper 420 may pass through the predetermined gap 102 to clean the inner surfaces of the electrodes 110A, 110B. The biasing members may then push the electrodes 110A, 110B back toward one another to recreate the predetermined gap 102.

One or more sensors (one is shown: 440) and a controller 450 may be used to determine the location of the wiper 420 and/or the distance between the electrodes 110A, 110B. The location of the wiper 420 may then be used to determine that the wiper 420 is positioned between the electrodes 110A, 110B, is not positioned between the electrodes 110A, 110B, and/or that the gap between the electrodes 110A, 110B was effectively cleaned. The sensor 440 may be located within the cup 410, and the controller 450 may be located outside of the cup 410. The sensor 440 may be coupled to the electrode(s) 110A, 110B, the interior of the cup 410, the wiper 420, the motor 810 (FIG. 8), the shaft 820 (FIG. 8), or a combination thereof.

In one embodiment, the sensor 440 may be a strain gauge that is configured to measure a strain (e.g., on the wiper 420) and to transmit an electrical signal with the strain measurement to the controller 450. The strain measurement may be used to determine the position of the wiper 420 (e.g., first rotational position or second rotational position) and/or the distance between the electrodes 110A, 110B. In another embodiment, the sensor 440 may be a pressure sensor that is configured to measure a change in pressure as the wiper 420 contacts and passes between the electrodes 110A, 110B (e.g., a mud pulse). The sensor 440 may then transmit an electrical signal with the pressure measurement to the controller 450 that may be used to determine the position of the wiper 420 and/or the distance between the electrodes 110A, 110B. In another embodiment, the sensor 440 may be a torque sensor that is configured to measure a change in torque as the wiper 420 contacts and passes between the electrodes 110A, 110B. The sensor 440 may then transmit an electrical signal with the torque measurement to the controller 450 that may be used to determine the position of the wiper 420 and/or the distance between the electrodes 110A, 110B. In another embodiment, the wiper 420 may be made of a magnetic material, and the sensor 440 may be configured to detect the magnetic material as it passes thereby. The sensor 440 may then transmit an electrical signal with the magnetic measurement to the controller 450 that may be used to determine the position of the wiper 420 and/or the distance between the electrodes 110A, 110B. In another embodiment, the sensor 440 may be a counter that is configured to count the number of rotations of the wiper 420. The sensor 440 may then transmit an electrical signal with the counter measurement to the controller 450 that may be used to determine the position of the wiper 420 and/or the distance between the electrodes 110A, 110B.

FIGS. 5A and 5B illustrate a side view and a top view, respectively, of the ES testing device 400 with the inlet 412 and/or the outlet 414 placed closer to the electrodes 110A, 110B and/or the wiper 420, according to an embodiment. In this particular embodiment, the outlet 424 is positioned closer to the electrodes 110A, 110B (e.g., in comparison to the outlet 424 in FIGS. 4A and 4B).

After the ES test has concluded and the voltage supplied to the electrodes 110A, 110B has been turned off (e.g., between ES tests), the fluid sample (or another fluid) may continue to flow into the cup 410 via the inlet 412 and/or out of the cup 410 via the outlet 414. This differs from conventional cleaning techniques that have no fluid flowing while the electrodes are off and/or being cleaned.

As shown in FIGS. 5A and 5B, a distance between the electrodes 110A, 110B and the outlet 414 may be less than a predetermined distance. More particularly, the distance between the ends 112A, 112B of the electrodes 110A, 110B and the outlet 414 may be less than the predetermined distance. Although not shown, in another embodiment, a distance between the electrodes 110A, 110B and the inlet 412 may also or instead be less than the predetermined distance. More particularly, the distance between the ends 112A, 112B of the electrodes 110A, 110B and the inlet 412 may be less than the predetermined distance. The predetermined distance may be less than or equal to 50 cm, 20 cm, 10 cm, 5 cm, 3 cm, 1 cm, 5 mm, 3 mm, or 1 mm.

By reducing the distance between the electrodes 110A, 110B and the outlet 414 (e.g., in comparison to FIGS. 4A and 4B), the fluid flowing between the ends 112A, 112B of the electrodes 110A, 110B may experience more of a suction force that may help to clean the electrodes 110A, 110B. Similarly, if the distance between the electrodes 110A, 110B and the inlet 412 is reduced, the fluid flowing between the ends 112A, 112B of the electrodes 110A, 110B may experience more of a pushing/blowing force that may help to clean the electrodes 110A, 110B.

In one embodiment, the wiper 420 may pass through the predetermined gap 102 between the electrodes 110A, 110B while the suction and/or blowing force is being exerted. When the wiper 420 is within the predetermined gap 102, the flowpath through the predetermined gap 102 is reduced, forming a funnel or nozzle which increases the velocity of the fluid flowing between the ends 112A, 112B of the electrodes 110A, 110B. The velocity may be from about 1 m/s to about 40 m/s or about 2 m/s to about 20 m/s. This may further aid in the cleaning of the electrodes 110A, 110B.

Figure 6B:
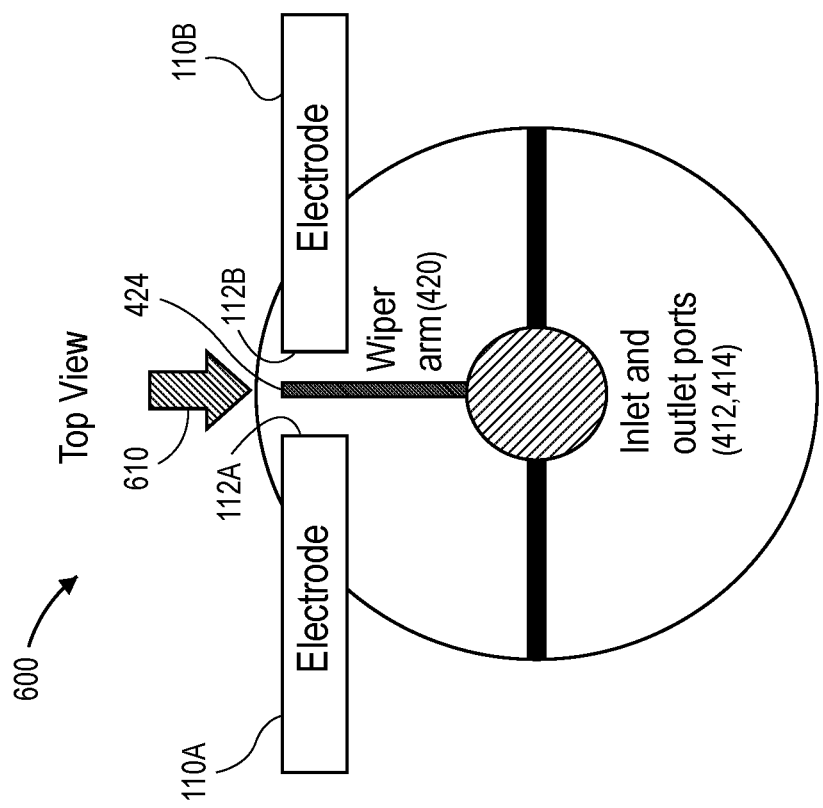
FIGS. 6A and 6B illustrate a side view and a top view, respectively, of another ES testing device with a cleaning fluid outlet, according to an embodiment.
Figure 6A:
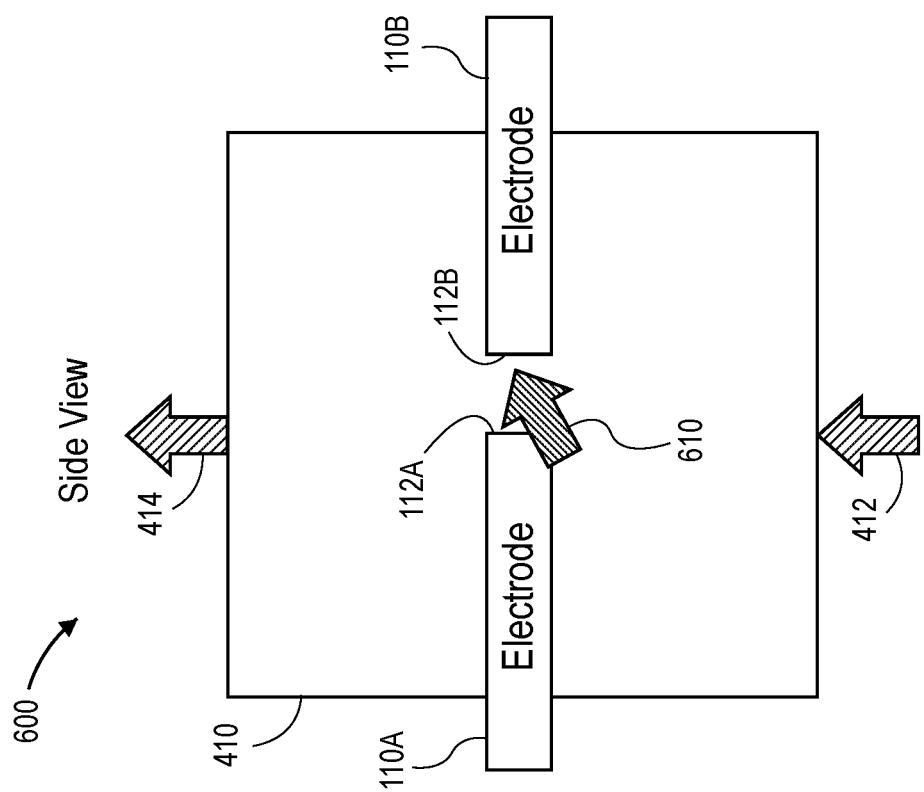

FIGS. 6A and 6B illustrate a side view and a top view, respectively, of another ES testing device 600 with a cleaning fluid outlet 610, according to an embodiment. Similar to the ES testing device 400 in FIGS. 4A and 4B, the ES testing device 600 in FIGS. 6A and 6B may also include the cup 410, the electrodes 110A, 110B, and (optionally) the wiper 420. In addition, the testing device 600 may include a cleaning fluid outlet 610 that is configured to be positioned at least partially within the cup 410. The inlet 412, the outlet 414, the cleaning fluid outlet 610, or a combination thereof may be referred to as a port (or ports).

After the ES test has concluded and the voltage supplied to the electrodes 110A, 110B has been turned off (e.g., between ES tests), the fluid sample that was tested may be drained from the cup 410. The cleaning fluid outlet 610 may be or include a nozzle or jet that is then configured to direct a cleaning fluid toward the electrodes 110A, 110B to clean the electrodes 110A, 110B. More particularly, the cleaning fluid outlet 610 may be configured to direct the cleaning fluid toward the ends 112A, 112B of the electrodes 110A, 110B and/or the distal end 424 of the wiper 420. The cleaning fluid outlet 610 may direct the cleaning fluid when the wiper 420 is in the first rotational position (e.g., between the electrodes 110A, 110B) or when the wiper 420 is in the second rotational position (e.g., not between the electrodes 110A, 110B). The cleaning fluid may be or include gas (e.g., air), a base oil, a solvent (e.g., hydrocarbon-based or waterbased), abrasive particles, or a combination thereof. The cleaning fluid may have a velocity from about 1 m/s to about 50 m/s or about 5 m/s to about 40 m/s.

FIGS. 7A and 7B illustrate a side view and an enlarged portion of the side view, respectively, of the ES testing device 600 with two cleaning fluid outlets 610A, 610B, according to an embodiment. The first cleaning fluid outlet 610A may be configured to direct the cleaning fluid at the first electrode 110A (e.g., the end 112A), and the second cleaning fluid outlet 610B may be configured to direct the cleaning fluid at the second electrode 110B (e.g., the end 112B). The cleaning fluid streams may cross one another. In another embodiment, the cleaning fluid outlets 610A, 610B may be slightly laterally offset from one another so that the cleaning fluid streams do not interfere with one another. The cleaning fluid may be directed at an angle with respect to the central longitudinal axis 111 through the electrodes 110A, 110B. The angle may be from about 10° to about 80°, about 20° to about 70°, or about 30° to about 60°.

In one embodiment, a rheometer 710 may be positioned at least partially within the cup 410. The rheometer 710 may be positioned above the electrodes 110A, 110B and/or the cleaning fluid outlets 610A, 610B. The rheometer 710 may be at least partially submerged in the fluid sample (e.g., during testing). The rheometer 710 may measure the rheology of the fluid. In addition to the rheometer 710, one or more other devices may also be positioned in the cup 410 (e.g., in the fluid) to measure the pH, temperature, density, oil/water/solids, or a combination thereof.

Figure 8B:
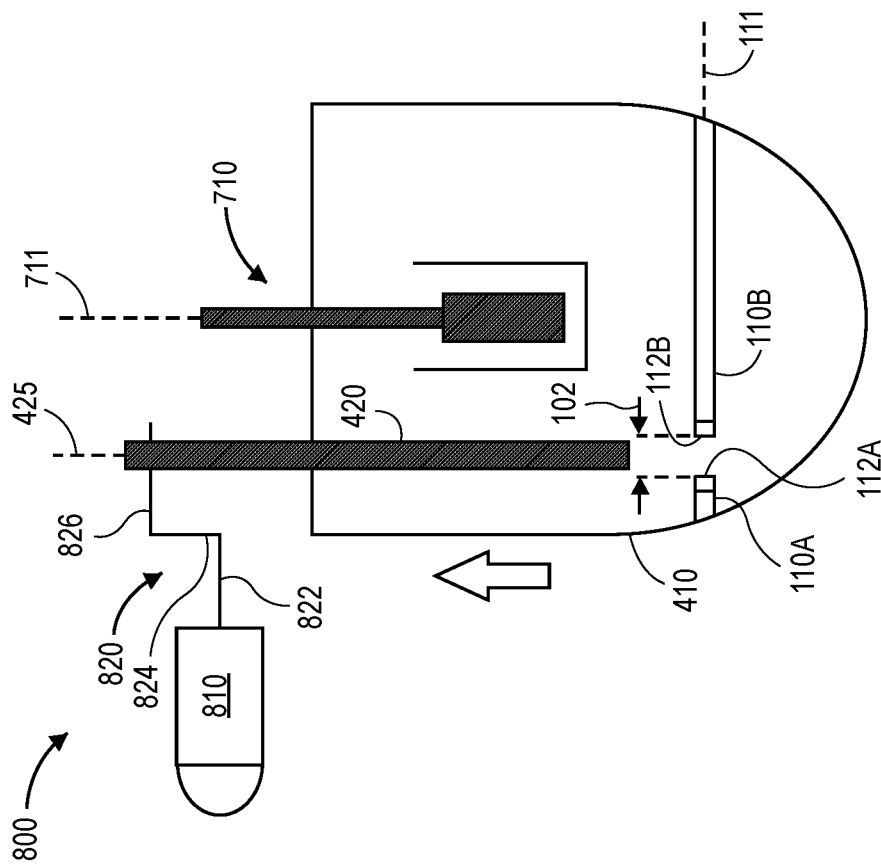
FIGS. 8A and 8B illustrate side views of another ES testing device, according to an embodiment.
Figure 8A:
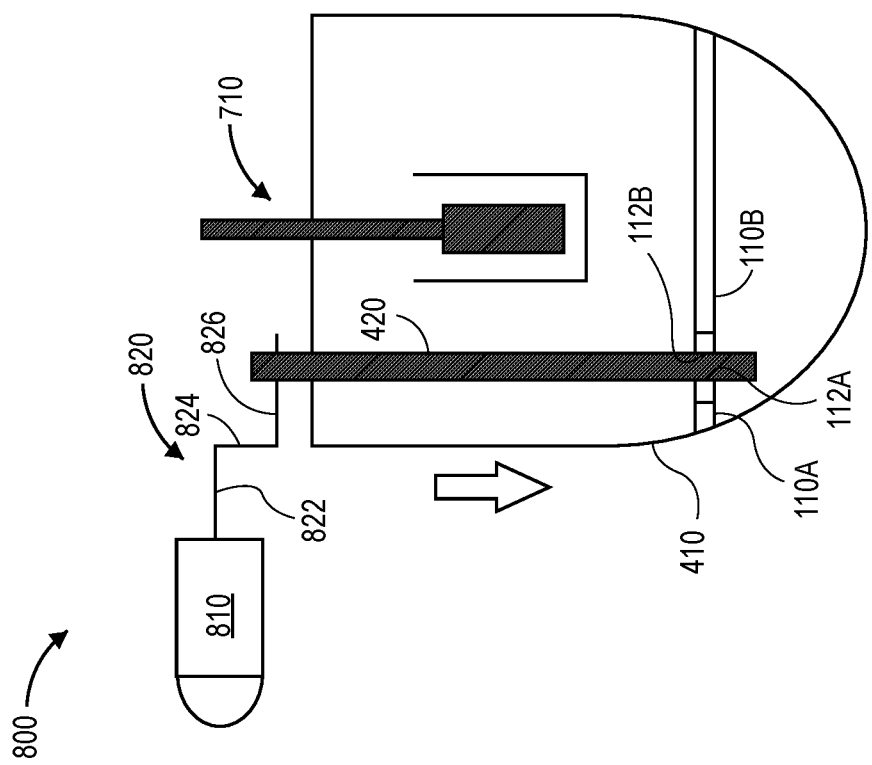

FIGS. 8A and 8B illustrate side views of another ES testing device 800, according to an embodiment. Similar to the ES testing device 400 in FIGS. 4A and 4B, the ES testing device 800 in FIGS. 8A and 8B may also include the cup 410, the electrodes 110A, 110B, and the wiper 420. The wiper 420 may extend substantially vertically within the cup 410. For example, a central longitudinal axis 425 through the wiper 420 may be substantially perpendicular to a central longitudinal axis 111 through the electrodes 110A, 110B.

In the embodiment shown, a motor 810 and a shaft 820 may be positioned outside of the cup 410 (and thus outside of the fluid being tested). This may reduce or prevent leaks due to elevating the shaft seals above the fluid level. The shaft 820 may be positioned between and coupled to the motor 810 and a first (e.g., upper) end portion of the wiper 420. In one example, the shaft 820 may include a first (e.g., horizontal) portion 822 that is connected to the motor 810, a second (e.g., vertical) portion 824, and a third (e.g., horizontal) portion 826 that is connected to the upper end portion of the wiper 420.

After the ES test has concluded (e.g., between ES tests), the motor 810 and the shaft 820 may cause the wiper 420 to cycle between the first position that is at least partially between the electrodes 110A, 110B (FIG. 8A) and the second position that is not between the electrodes 110A, 110B (FIG. 8B) to clean the electrodes 110A, 110B. During testing, the wiper 420 may remain in the second position. As mentioned above, the wiper 420 may contact the ends 112A, 112B of the electrodes 110A, 110B as the wiper 420 passes through the electrodes 110A, 110B.

In one embodiment, the wiper 420 may move in a single dimension (e.g., vertically up and down). In another embodiment, the wiper 420 may move in two dimensions (e.g., vertically up and down and into and out of the page). For example, the wiper 420 may move through a substantially elliptical path, which may provide enhanced cleaning versus the one dimensional movement. In another embodiment, the wiper 420 may be or include a continuous belt wiper.

In the embodiment shown, the ES testing device 800 may also include the rheometer 710, which may be positioned at least partially within the cup 410 and above the electrodes 110A, 110B. A central longitudinal axis 711 through the rheometer 710 may be substantially parallel to the central longitudinal axis 425 through the wiper 420 and substantially perpendicular to the central longitudinal axis 111 through the electrodes 110A, 110B.

Figure 9B:
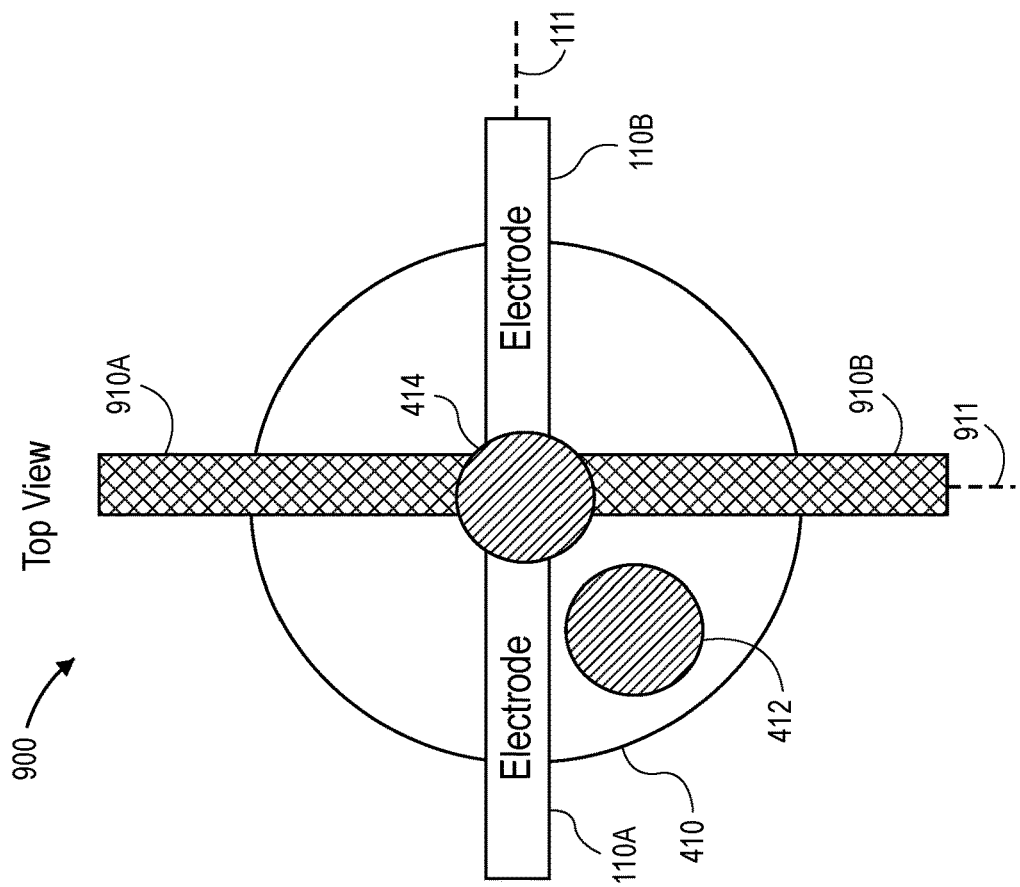
FIGS. 9A and 9B illustrate a side view and a top view, respectively, of another ES testing device with secondary (cleaning) electrodes, according to an embodiment.
Figure 9A:
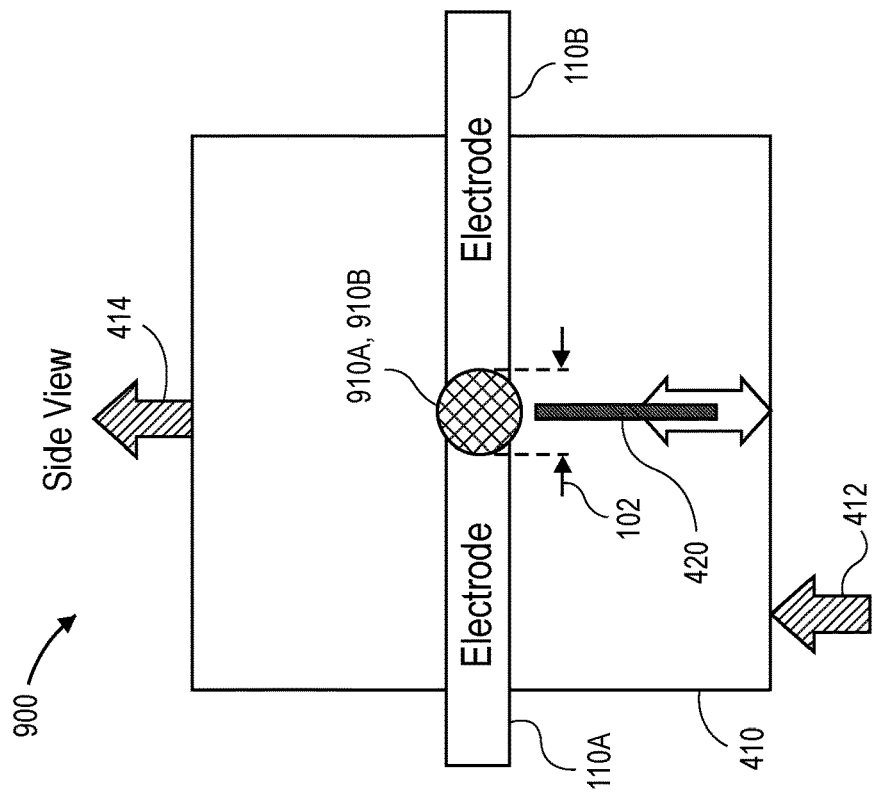

FIGS. 9A and 9B illustrate a side view and a top view, respectively, of another ES testing device 900 with secondary (cleaning) electrodes 910A, 910B, according to an embodiment. The electrodes 110A, 110B, 910A, 910B may be in substantially the same plane (e.g., a horizontal plane). The central longitudinal axis 111 through the electrodes 110A, 110B may be substantially perpendicular to a central longitudinal axis 911 through the electrodes 910A, 910B.

When the test is being conducted, the secondary electrodes 910A, 910B may remain off (e.g., no voltage is supplied thereto). After the ES test has concluded and the voltage supplied to the electrodes 110A, 110B has been turned off (e.g., between ES tests), the secondary electrodes 910A, 910B may be turned on (or pulsed on and off). This may destabilize, scramble, and/or disrupt the fluid segregation and/or alignment/separation of the components in the fluid sample. This may help to prevent particles in the fluid sample from building up on the electrodes 110A, 110B. This may also help to prevent and/or break up fluid bridges (e.g., conductive paths 124).

As shown, the wiper 420 may (optionally) be present in this embodiment. When present, the wiper 420 may move in a single dimension (e.g., vertically up and down) so as to not interfere with or contact the electrodes 110A, 110B, 910A, 910B. Although several different embodiments are shown in the Figures and described above, the features of these embodiments may be combined in any manner.

Figure 10:
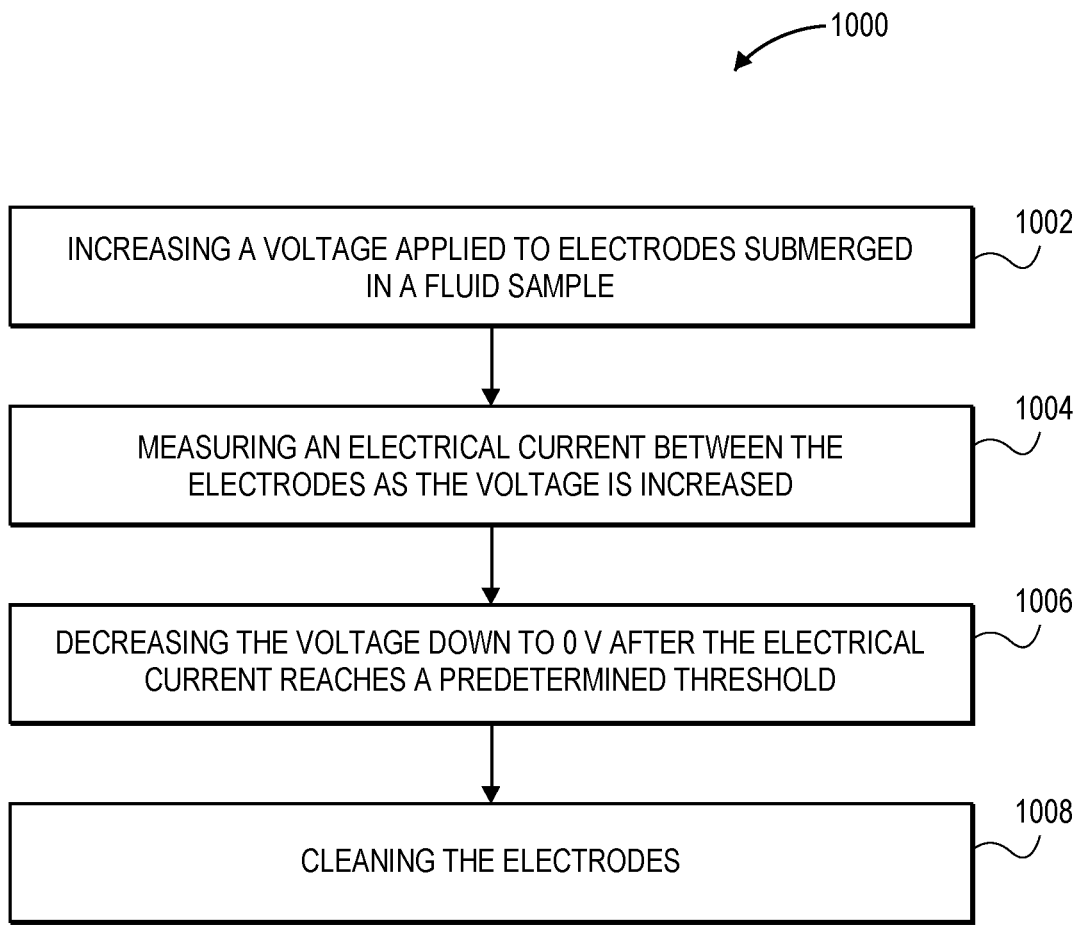
FIG. 10 illustrates a flowchart of a method for performing the ES test, according to an embodiment.

FIG. 10 illustrates a flowchart of a method 1000 for performing an electrical stability (ES) test, according to an embodiment. An illustrative order of the method 1000 is provided below; however, one or more aspects of the method 1000 may be performed in a different order, split, combined, repeated, or omitted.

The method 1000 may begin when the electrodes 110A, 110B are submerged within the fluid sample in the cup 410. The method 1000 may include increasing a voltage applied to the electrodes 110A, 110B, as at 1002.

The method 1000 may also include measuring the electrical current between the electrodes 110A, 110B as the voltage is increased, as at 1004. The voltage may be increased until an electrical current between the electrodes 110A, 110B reaches a predetermined threshold (e.g., 61 microamps).

The method 1000 may also include decreasing the voltage down to 0 V after the electrical current reaches the predetermined threshold, as at 1006.

The method 1000 may also include cleaning the electrodes 110A, 110B, as at 1008. The electrodes 110A, 110B may be cleaned while the voltage applied thereto is 0 V. The electrodes 110A, 110B may be cleaned using the embodiments described above with respect to FIGS. 4A, 4B, 5A, 5B, 6A, 6B, 7A, 7B, 8A, 8B, 9A, 9B, or any combination thereof. For example, the wiper 420 may contact the electrodes 110A, 110B and pass within the predetermined gap 102. The width 421 of the wiper 420 may be greater than the predetermined gap 102. The wiper 420 may be configured to deform as the wiper 420 contacts the electrodes 102A, 102B and passes within the predetermined gap 102 such that the width 421 becomes substantially equal to the predetermined gap 102 and sides of the wiper 420 contact ends 112A, 112B of the electrodes 110A, 110B to clean the electrodes 110A, 110B.

As used herein, the terms "inner" and "outer"; "up" and "down"; "upper" and "lower"; "upward" and "downward"; "upstream" and "downstream"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. An electrical stability (ES) testing device, comprising:
a cup configured to receive a fluid sample;
a pair of electrodes positioned at least partially within the cup, wherein the electrodes are spaced apart from one another by a predetermined gap, and wherein the electrodes are configured to have the fluid sample positioned within the predetermined gap while performing an ES test on the fluid sample in the cup; and
a wiper positioned at least partially within the cup, wherein the wiper is configured to pass between the electrodes after the ES test has concluded, wherein a width of the wiper is greater than the predetermined gap between the electrodes, and wherein the wiper is configured to deform as the wiper passes through the predetermined gap such that the width becomes substantially equal to the predetermined gap and sides of the wiper contact ends of the electrodes to clean the electrodes.

2. The ES testing device of claim 1, wherein the sides of the wiper comprise a plurality of ridges or blades that are configured to contact the ends of the electrodes.

3. The ES testing device of claim 1, wherein the cup comprises an inlet and an outlet through which the fluid sample flows, and wherein a distance between the ends of the electrodes and the inlet, the outlet, or both is less than about 1 cm.

4. The ES testing device of claim 3, wherein a velocity of the fluid sample flowing between the electrodes is from about 1 m/s to about 40 m/s.

5. The ES testing device of claim 3, wherein the wiper is configured to pass through the predetermined gap as the fluid sample flows through the predetermined gap.

6. The ES testing device of claim 1, wherein the fluid sample is removed from the cup after the ES test has concluded, and wherein the ES testing device further comprises a cleaning fluid outlet positioned at least partially within the cup that is configured to direct a cleaning fluid toward the ends of the electrodes to clean the electrodes.

7. The ES testing device of claim 6, wherein the cleaning fluid outlet comprises:
a first cleaning fluid outlet that is configured to direct pulses of a first portion of the cleaning fluid toward a first of the electrodes; and
a second cleaning fluid outlet that is configured to direct pulses of a second portion of the cleaning fluid toward a second of the electrodes.

8. The ES testing device of claim 1, wherein the electrodes are substantially horizontal, and wherein the wiper is configured to move through a two dimensional path in a substantially vertical plane.

9. The ES testing device of claim 8, further comprising:
a motor positioned outside of the cup; and
a shaft positioned outside of the cup, wherein the shaft comprises:
a first horizontal portion coupled to the motor;
a vertical portion coupled to the first horizontal portion; and
a second horizontal portion coupled to the vertical portion and the wiper.

10. The ES testing device of claim 1, wherein the electrodes are configured to receive a voltage while performing the ES test on the fluid sample, wherein the voltage to the electrodes ceases after the ES test has concluded, wherein the ES testing device further comprises a second pair of electrodes positioned at least partially within the cup, and wherein the second pair of electrodes is configured to receive a voltage after the ES test has concluded.

11. The ES testing device of claim 10, wherein the electrodes and the second pair of electrodes are in a substantially horizontal plane, and wherein a central longitudinal axis through the electrodes is substantially perpendicular to a central longitudinal axis through the second pair of electrodes.

12. The ES testing device of claim 1, further comprising a biasing member that is configured to:
allow the electrodes to move away from one another as the wiper passes between the electrodes, thereby causing a distance between the electrodes to be greater than the predetermined gap; and
push the electrodes back toward one another after the wiper has passed between the electrodes, thereby causing the distance to revert back to the predetermined gap.

13. An electrical stability (ES) testing device, comprising:
a cup configured to receive a fluid sample;
a pair of electrodes positioned at least partially within the cup, wherein the electrodes are spaced apart from one another by a predetermined gap, and wherein the electrodes are configured to have the fluid sample positioned within the predetermined gap while performing an ES test on the fluid sample in the cup; and
a port positioned at least partially within the cup, wherein the port is configured to have a cleaning fluid flow therethrough after the ES test has concluded, and wherein the cleaning fluid flows toward the electrodes, through the predetermined gap, or both at a velocity that is greater than or equal to about 1 m/s to clean the electrodes, and, wherein a distance between ends of the electrodes and the port is less than about 1 CM.

14. The ES testing device of claim 13, wherein the fluid sample is removed from the cup after the ES test has concluded, and wherein the cleaning fluid comprises a gas that is directed toward ends of the electrodes.

15. The ES testing device of claim 13, wherein the port comprises:
- a first cleaning fluid outlet that is configured to direct pulses of a first portion of the cleaning fluid toward a first of the electrodes; and
- a second cleaning fluid outlet that is configured to direct pulses of a second portion of the cleaning fluid toward a second of the electrodes.

16. The ES testing device of claim 13, wherein the port comprises an inlet or an outlet of the cup, and wherein the cleaning fluid comprises the fluid sample.

17. The ES testing device of claim 13, further comprising a wiper that is configured to pass between the electrodes simultaneously with the cleaning fluid flowing toward the electrodes, through the predetermined gap, or both.

18. A method for performing an electrical stability (ES) test, the method comprising:
- increasing a voltage applied to a pair of electrodes until an electrical current between the electrodes reaches a predetermined threshold, wherein the electrodes are submerged within a fluid sample within a cup, and wherein the electrodes are spaced apart from one another by a predetermined gap;
- decreasing the voltage after the electrical current reaches the predetermined threshold; and
- causing a wiper in the cup to pass through the predetermined gap and contact the electrodes after the voltage is decreased, wherein a width of the wiper is greater than the predetermined gap, and wherein the wiper is configured to deform as the wiper passes through the predetermined gap such that the width becomes substantially equal to the predetermined gap and sides of the wiper contact ends of the electrodes to clean the electrodes.

19. The method of claim 18, further comprising causing at least a portion of the fluid sample to flow through the predetermined gap while the electrodes are being cleaned.

20. The method of claim 19, wherein the wiper passes through the predetermined gap simultaneously with the portion of the fluid sample flowing through the predetermined gap.

21. The method of claim 18, wherein the fluid sample is removed from the cup prior to the wiper passing through the predetermined gap.

22. The method of claim 21, further comprising directing a cleaning fluid toward the electrodes to clean the electrodes simultaneously with the wiper passing through the predetermined gap.

23. The method of claim 18, further comprising increasing a voltage applied to a second pair of electrodes in the cup after the voltage of the electrodes is decreased to clean the pair of electrodes.

* * * * *